UNITED STATES PATENT OFFICE.

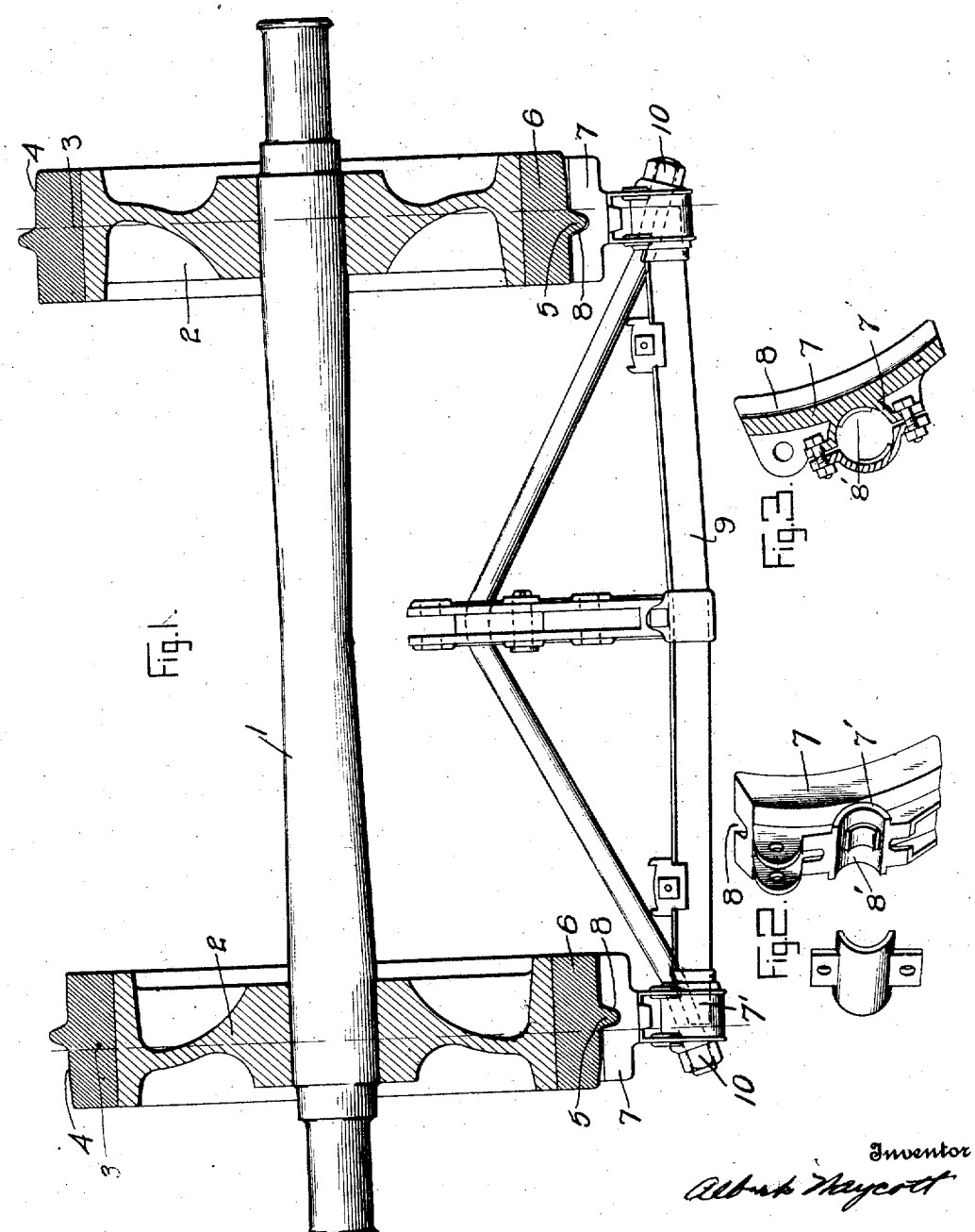

ALBERT WAYCOTT, OF CLEVELAND, OHIO, ASSIGNOR TO THE DAMASCUS BRAKE BEAM CO., OF CLEVELAND, OHIO, A CORPORATION OF OHIO.

CAR-WHEEL AND BRAKE-SHOE.

988,608.  Specification of Letters Patent.  Patented Apr. 4, 1911.

Application filed August 30, 1910. Serial No. 579,668.

*To all whom it may concern:*

Be it known that I, ALBERT WAYCOTT, a citizen of the United States, residing at Cleveland, in the county of Cuyahoga and State of Ohio, have invented an Improvement in Car-Wheels and Brake-Shoes, of which the following is a specification.

The present invention relates to car wheels and the braking shoes therefor and has for its purpose the construction and arrangement of those parts to the end that a braking action may be effected commensurate with the increase in weight of the cars being constructed nowadays; and yet to accomplish this result without augmenting the present used brake operation mechanism.

Owing to the fact that the weight of cars now being built by the railroads, especially passenger cars, is being materially increased, it has developed that on heavy trains made up of modern heavy cars, when running at high speed, that it is impossible to stop the trains in the same distance as heretofore. The railroad and air brake companies have attempted to remedy this difficulty by using larger air brake cylinders, increased air pressure, and greatly increased pressure on the brake beams and brake shoes. Efforts along these lines have developed the fact that the brake beams will have to be materially increased in strength to withstand the increased pressure; also that the best known material, at this time, for brake shoes will not give the necessary amount of friction owing to the heat generated between the face of the brake shoe and the tread of the wheel when the train is running at high speed, and heavy pressure applied to the brakes causes the metal in the brake shoe surface to melt and forms a lubricant instead of a friction surface. Even if it were possible to produce a metal that will not fuse under these conditions, there would be danger of having the pressure of the brakes against the sides of the wheels greater than the pressure of the weight on the car on top of the journals, which would result in the journals being moved from under their bearing when the extremely high brake pressure is applied.

The object of my invention is to overcome these difficulties without the necessity of using larger air brake cylinders increasing the air pressure or materially increasing the pressure on the brake beams and brake shoes.

The invention is disclosed in its preferred embodiment in the accompanying drawing wherein:—

Figure 1 is a top plan view thereof, the car wheels being shown in section; Fig. 2 is a detailed perspective view of the brake shoe; and Fig. 3 is a longitudinal sectional view of the same.

1 represents the axle and 2 the wheels. In the drawing the dotted lines 3 represent the width of the tread of the wheel now in use. By my invention, I increase the tread of the wheel as at 4 so that there is practically an equal amount of metal on each side of the usual flange 5. I place a steel tire 6 on the wheel provided with the usual flange. This increased tread of the wheel increases the braking surface approximately 100%. As shown the extra rim or tread is on the inside of the wheel. Having extended the rim or tread of the wheel, I am enabled to extend the area of surface of the shoe 7; in fact double its friction surface. The shoe 7 is provided with a groove 8 adapted to receive the flange 5 of the wheel. The fact of the shoe embracing the flange also serves to materially increase the braking surface of the shoe. By this construction I am enabled to make the length of the new shoe the same as the present standard length with the single width shoes now in use, and at the same time obtain double the braking surface. By this construction of wheel tread and brake shoe I am enabled to shorten the brake beam, thus materially increasing the strength of said beam and with the increased friction area on the brake shoes the pressure on the brake beams need not be as high as was customary with the former construction of shoe.

In making the proposed changes in the arrangement of brake beam and shoes, I am enabled to dispense with the usual brake heads and substitute therefor a new type of shoe such as that disclosed in Figs. 2 and 3. This structure comprises a shoe 7 having formed integrally therewith, a part 7', and within the latter is provided an orifice 8' into which fits the brake beam 9. When in position, the brake shoe is secured through the medium of the usual locking nut 10, screw threaded on the end of the beam 9.

I claim:—

1. The combination with a car wheel having a substantially broad tread surface of one diameter and a circumferential flange disposed intermediate the side edges thereof, of a brake shoe therefor constructed with its braking surface conforming to the periphery of the wheel tread and flange.

2. The combination with a car wheel having a substantially broad tread surface and a circumferential flange disposed medially of the side edges thereof, of a brake shoe therefor co-extensive in width with the tread surface of the wheel and constructed with its braking surface conforming to the periphery of the tread surface and flange.

3. The combination with a car wheel having a substantially broad tread surface and a circumferential flange disposed medially of the side edges thereof, of a brake shoe therefor co-extensive in width with the tread surface of the wheel, and constructed with a recess in its braking surface conforming to said flange, the braking surface of the shoe adapted to come into friction engagement with the full width of the wheel periphery during the braking action.

The foregoing specification signed at Cleveland, Ohio, this 21st day of July, 1910.

ALBERT WAYCOTT.

In presence of—
GEO. E. HAGENBECK,
E. D. PUGH.